(12) United States Patent
Platto et al.

(10) Patent No.: US 9,085,232 B2
(45) Date of Patent: Jul. 21, 2015

(54) VEHICLE GRILLE CLOSE-OUT ASSEMBLY

(71) Applicant: Ford Global Technologies, LLC, Dearborn, MI (US)

(72) Inventors: Gordon M. Platto, Troy, MI (US); David Michael Lechkun, Shelby Twp., MI (US); Dong Park, Royal Oak, MI (US); Brad Alan Richards, Bloomfield Hills, MI (US); Jonathan Fontaine, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 13/740,156

(22) Filed: Jan. 11, 2013

(65) Prior Publication Data

US 2014/0196965 A1    Jul. 17, 2014

(51) Int. Cl.
*B60K 11/00*    (2006.01)
*B60K 11/08*    (2006.01)

(52) U.S. Cl.
CPC .................................. *B60K 11/085* (2013.01)

(58) Field of Classification Search
USPC .............................. 180/68.1–68.2; 296/180.1
See application file for complete search history.

(56) References Cited

U.S. PATENT DOCUMENTS

| 4,410,032 | A | 10/1983 | Mori |
| 7,717,208 | B2 | 5/2010 | Knauer |
| 7,775,582 | B2 | 8/2010 | Browne et al. |
| 8,186,746 | B2 | 5/2012 | Mackenzie et al. |
| 2009/0085371 | A1 | 4/2009 | Nagahama |
| 2011/0070817 | A1 | 3/2011 | Walters |
| 2012/0097464 | A1* | 4/2012 | Waugh .......................... 180/68.1 |
| 2012/0111652 | A1* | 5/2012 | Charnesky et al. .......... 180/68.1 |
| 2012/0330513 | A1 | 12/2012 | Charnecky et al. |

FOREIGN PATENT DOCUMENTS

| DE | 10235702 B4 | 12/2008 |
| JP | 06298129 A | 10/1994 |
| JP | 4237686 B2 | 11/2009 |
| WO | 2004089729 A1 | 10/2004 |

* cited by examiner

*Primary Examiner* — John Walters
*Assistant Examiner* — James Triggs
(74) *Attorney, Agent, or Firm* — Frank A. MacKenzie; Brooks Kushman P.C.

(57) ABSTRACT

A vehicle grille assembly is provided with a grille and a close-out assembly. The close-out assembly is adapted to at least partially block an airflow opening in the vehicle grille is moveable to translate and rotate with respect to the airflow opening.

15 Claims, 5 Drawing Sheets

VEHICLE GRILLE CLOSE-OUT ASSEMBLY

TECHNICAL FIELD

The present disclosure relates to a grille close-out assembly for automotive vehicles.

BACKGROUND

Vehicles such as trucks and passenger cars have a front fascia with a grille having openings to permit airflow into the engine compartment to provide cooling. While the grille openings provide beneficial cooling effects, the airflow into the engine compartment increases the aerodynamic drag of the vehicle. The air that enters the grille openings instead of being deflected around the vehicle increases drag and decreases the aerodynamic airflow considerations of the vehicle.

Aerodynamic airflow considerations are a priority of vehicle body design. Effective airflow management over a vehicle body can be critical in meeting functional demands for passenger compartment acoustics, fuel efficiency and safety of passenger type vehicles. Aerodynamic design also enhances vehicles control and improves speed of passenger vehicles. Front air dams are a common aerodynamic feature used to controls airflow around the vehicle and limit front end lift and create down-force.

SUMMARY

According to at least one embodiment, a vehicle grille assembly is provided with a grille and a close-out assembly. The close-out assembly is adapted to at least partially block an airflow opening in the vehicle grille is moveable to translate and rotate with respect to the airflow opening.

According to a further embodiment, the grille close-out assembly is movable to translate and rotate in a fore-aft direction being generally transverse to a front surface of the grille.

According to an even further embodiment, the grille includes a plurality of grille openings spaced apart in an upright direction and being elongated in a transverse direction, wherein the grille close-out includes a plurality of fins, wherein in the deployed position, the fins extend in the fore-aft direction, one of the plurality of fins disposed in each of the plurality of grille openings.

According to another embodiment, in the stowed position, the plurality of fins extend in the upright direction.

According to a further embodiment, the grille close-out assembly includes a close-out element including the plurality of fins mounted to a back plate.

According to an even further embodiment, the grille close-out assembly also includes a carrier arm mounted to slide in a fore-aft direction. The close-out element is pivotally connected to the carrier arm. The grille close-out assembly also includes a support arm including at least one roller connected to the support arm and supporting the close-out element. The close-out element translates on the roller with respect to the support arm when the carrier arm slides in the fore-aft direction. The close-out element pivots and is unsupported by the support arm in the stowed position.

According to another embodiment, in the deployed position, a distal end of the plurality of fins is generally coplanar with the front surface of the grille.

According to at least one embodiment, a vehicle is provided including a front fascia having a grille defining at least one airflow opening. A grille close-out assembly is adapted to at least partially block the airflow opening and is moveable to translate and rotate with respect to the airflow opening.

According to at least one other embodiment, a vehicle grille close-out assembly is provided. A close-out element is moveable between a stowed position and a deployed position. The close-out element is adapted to at least partially block an airflow opening in a vehicle grille in the deployed position. The assembly also includes a carrier arm mounted to slide in a fore-aft direction. The close-out element is pivotally connected to the carrier arm. The assembly also includes a support arm including at least one roller connected to the support arm and supporting the close-out element. The close-out element translates on the roller with respect to the support arm when the carrier arm slides in the fore-aft direction. The close-out element pivots and is unsupported by the support arm in the stowed position.

According to at least one embodiment, the support arm is mounted to a vehicle frame and the carrier arm is operatively connected to the vehicle frame by a roller.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When oncoming air reaches the front of the vehicle it move either up and over, down and under, or around the vehicle. Anything that causes the laminar flow of air to separate from a vehicle body, and become turbulent, causes drag. Therefore, when the flow of air separates and flows through a vehicle's grille and engine compartment, it causes drag. Air enters through the cooling opening, is forced to flow through the radiator, and then spills out untidily underneath the car. This turbulent movement of the radiator cooling air dramatically increases vehicle drag. Vehicle drag not only reduces fuel efficiency, but drag also can affect passenger compartment acoustics causing loud wind noise as well as affecting the safety of passenger type vehicles.

It is an advantage to have a vehicle grille that can selectively close the grille openings depending upon engine, vehicle or environmental conditions to reduce the drag when less air flow is required to the engine.

By having grille openings that can be selectively closed, it is also an advantage to prevent materials from passing through the grille and damaging the engine in certain environmental conditions. For example, dust, smoke, snow or standing water can cause damage to the vehicle engine.

Also, while airflow though the grille opening provide necessary cooling to the engine under some operating conditions, selectively closing the engine while an engine is still warming up also helps improve fuel efficiency by heating the engine up faster and reduces carbon emissions by heating up the engine and catalysts faster.

In addition to the functional advantages of being able to selectively close the grille openings, providing a device for closing the grille opening may improve the vehicle aesthetics. For example, closing the grille opening prevents the radiator from being visible through the grille openings.

Figure 1:
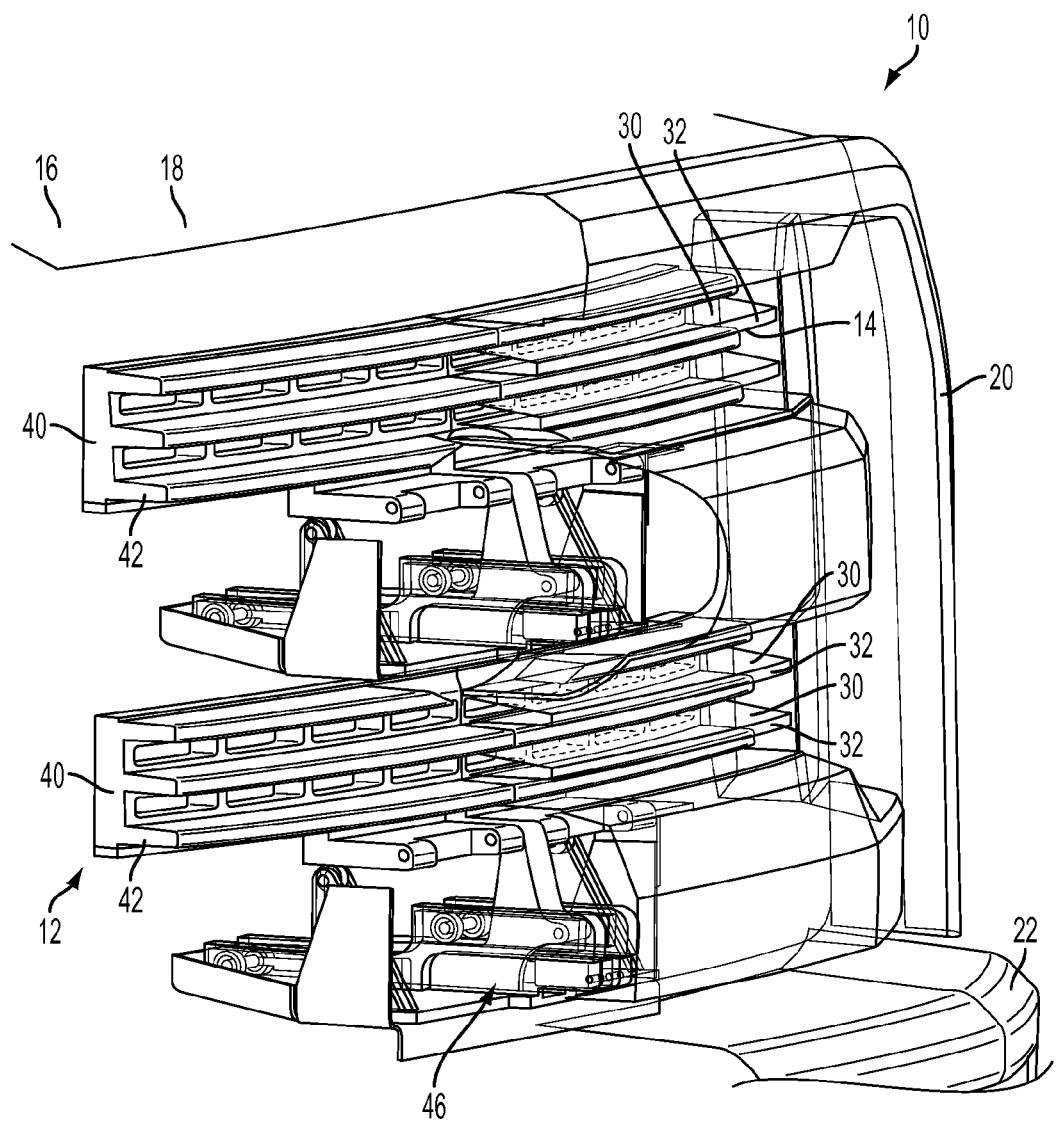
FIG. 1 is a side perspective view of a front portion of a passenger vehicle including a grille close-out assembly illustrated in a deployed position, in accordance with an embodiment of the present disclosure.

FIG. 1 illustrates a side perspective view of a front end 10 of a passenger vehicle having a grille close-out assembly 12 according to an embodiment of the present disclosure. The close-out assembly 12 is adapted to be selectively deployed to at least partially block an airflow opening in the vehicle grille 14. In FIG. 1, grille close-out assembly 12 in a deployed position.

The front end 10 of the vehicle includes an area forward of a passenger compartment in the fore-aft or longitudinal direction. The front end 10 includes a hood 16 defining an engine compartment 18 there beneath.

The front end 10 also includes a front fascia 20. The front fascia 20 is generally located forward of the hood 16. The front fascia 20 includes the front grille 14 and the bumper 22. The front grille 14 defines an opening to the engine compartment 18 in order to allow airflow into the air induction system and for cooling of the engine compartment 18. The grille 14 may be designed for vehicle styling and aesthetic appeal and may also include the vehicle manufacturer logo or may have ornamental design characteristics.

The vehicle grille 14 may define a plurality of grille openings 30. As illustrated in FIG. 1, the grille openings 30 are spaced apart in an upright direction. The grille openings 30 are elongated apertures in a transverse direction and extend between the front fascia 20. The grille openings 30 are defined between a plurality of grille slats 32.

The grille close-out assembly 12 is movable to translate and rotate in the fore-aft direction. However, the grille close-out assembly 12 may translate in another direction being generally transverse to a front surface 36 of the grille 14. The front surface 36 of the grille 14 is the appearance surface of the grille 14.

The grille close-out assembly 12 includes a close-out-element 40 for blocking the airflow through grille openings 30 when the close-out element 40 is in the deployed position. The close-element 40 includes a plurality of fins 42. In the deployed position illustrated in FIG. 1, the fins 42 extend in the fore-aft direction. One fin 42 is disposed in each of the grille openings 30 formed between the grille slats 32. For aesthetic purposes, in the deployed position, a distal end 44 of the fins 42 is generally coplanar with the front surface 36 of the grille 14.

Figure 5:
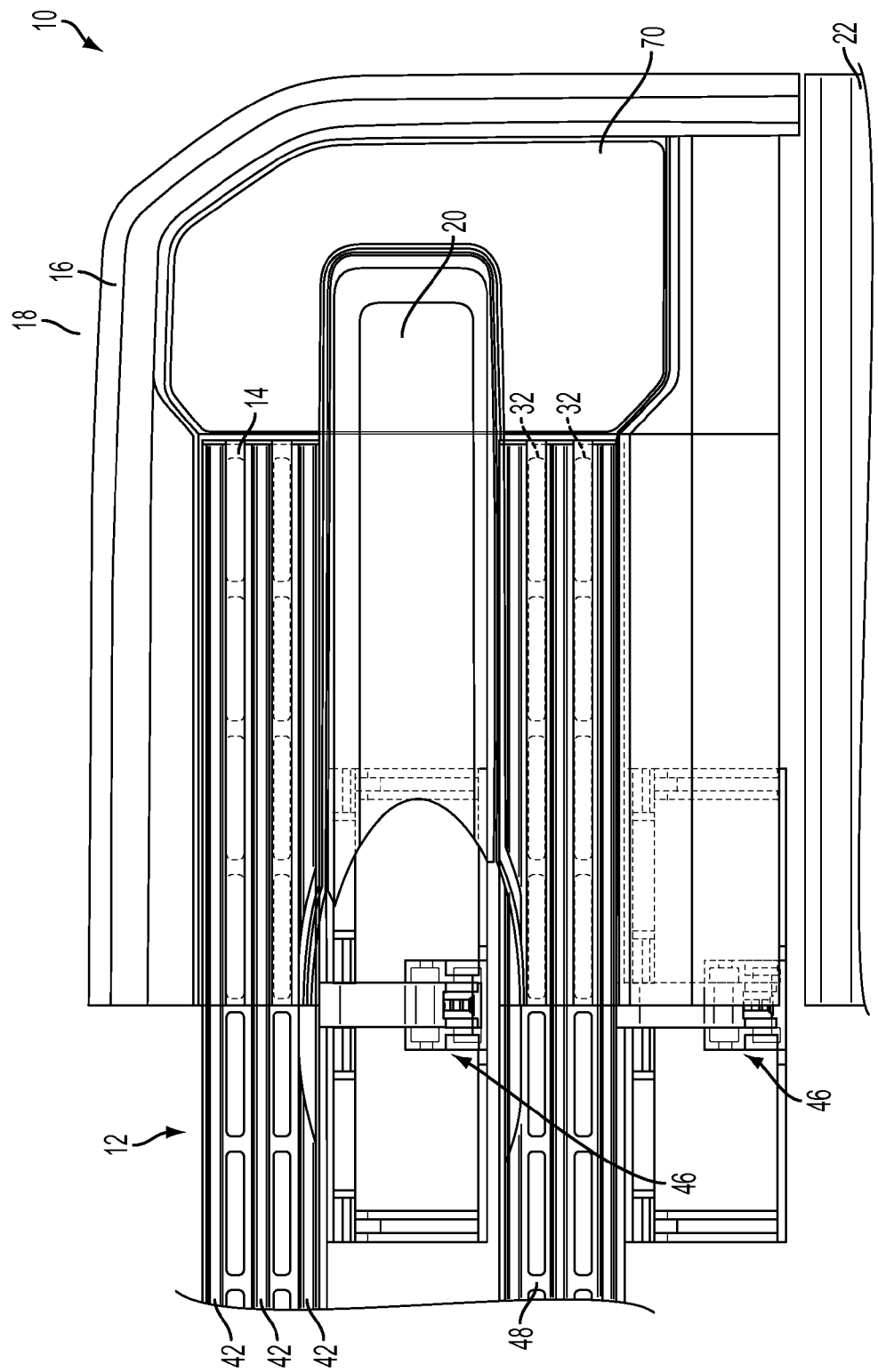
FIG. 5 is a front view of a front portion of a passenger vehicle including the grille and grille close-out assembly.

The close-out element 40 includes a back plate 48. The fins 42 extend transversely from the back plate 48. The fins 42 may be formed integrally with the back plate 48 or the fins 42 may be mounted to the back plate 48. The close-out element 40 may be formed of any suitable material. For example, for aesthetic purposes, the close-out element 40 may be formed to have a surface finish similar to the vehicle grille 14. As shown in the front view in FIG. 5, when the grille slats 32 and fins 42 may form a generally continuous appearance surface when the close-out element is in the deployed.

Figure 2A:
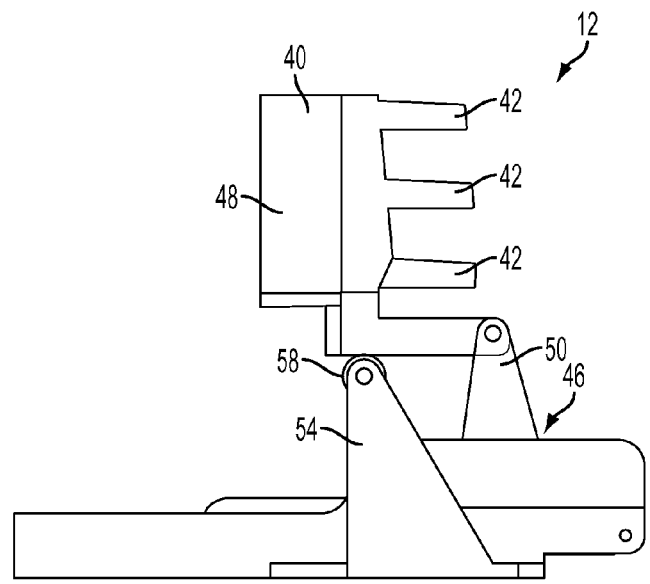
FIG. 2A is a side view of the grille close-out assembly illustrating the grille close-out assembly in a deployed position.

Turning now to FIG. 2, the grille close-out assembly 12 and a deployment mechanism 46 will be described in more detail. Similar to FIG. 1, FIG. 2A is a side view of the grille close-out assembly illustrating the grille close-out assembly in the fully deployed position.

The grille close-out assembly 12 includes the deployment mechanism 46 for linearly translating and rotating the close-out element 40 between the stowed position and the deployed position. The deployment mechanism 46 includes a carrier arm 50. The carrier arm 50 is mounted to slide in the fore-aft direction. The carrier arm 50 may be operatively connected to the vehicle frame by a roller 52. The close-out element 40 is pivotally connected to the carrier arm 50.

The deployment mechanism 46 also includes a support arm 54. The support arm 54 includes at least one roller 58 connected to the support arm 54. The support arm 54 and roller 58 supports the close-out element 40 as the close-out element 40 translates on the roller 58. The support arm 54 is stationary and may be mounted to a vehicle frame in a fixed location.

Figure 2B:
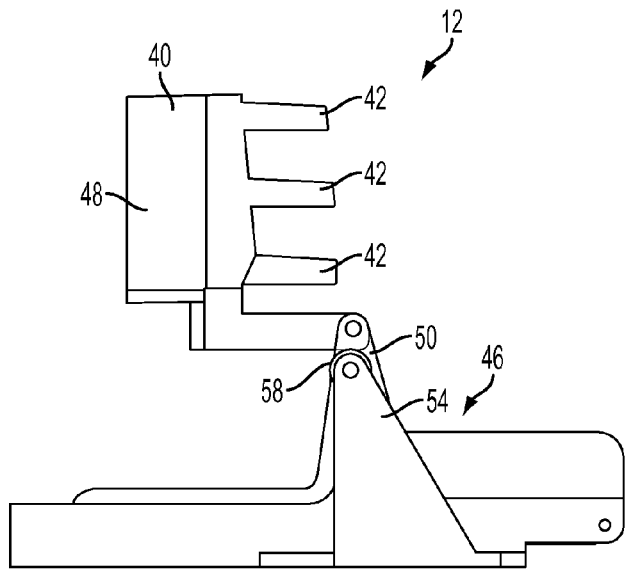
FIG. 2B is a side view of the grille close-out assembly illustrating the grille close-out assembly in an intermediate position.

The close-out element 50 translates with respect to the support arm 54 when the carrier arm 50 slides in the fore-aft direction. FIG. 2B illustrates the grille close-out assembly 12 in an intermediate position. In the intermediate position, the carrier arm 50 is moved in the fore-aft to an intermediate location proximate the support arm 54.

The carrier arm 50 is moved in the fore-aft direction with an actuator 60. As illustrated in the Figures, the actuator is a linear actuator that slides the carrier arm 50 linearly. The linear actuator 60 may be any sort of actuator which moves substantially along one plane or creates motion in a straight line. For example, the linear actuator 60 may be an electric motor-driven actuator, a pneumatic or hydraulic cylinder, a telescoping actuator, screw actuator or linear slide actuator.

Figure 2C:
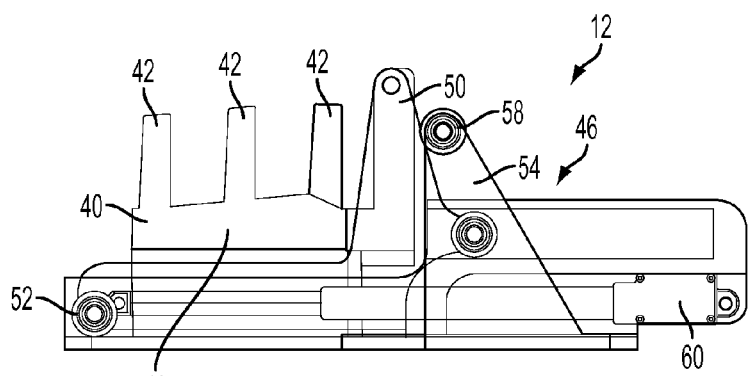
FIG. 2C is a side view of the grille close-out assembly illustrating the grille close-out assembly in a stowed position.

FIG. 2C illustrates the grille close-out assembly 12 in a fully stowed position. As the carrier arm 50 continues to slide in the fore-aft direction, the close-out element 40 pivots. The close-out element 40 pivots and rockers over the roller 58 to the stowed position.

In the fully stowed position, the close-out element 40 is unsupported by the support arm 54 or the roller in the stowed position. In the stowed position, the fins 42 extend in the upright direction. In at least one embodiment, in the stowed position, the close-out element 40 is at least partially concealed by a front fascia element 20. It is also contemplated that the close-out element 40 may be completely concealed by the front fascia 20 when the close-out assembly 12 is in the fully stowed position.

Figure 3:
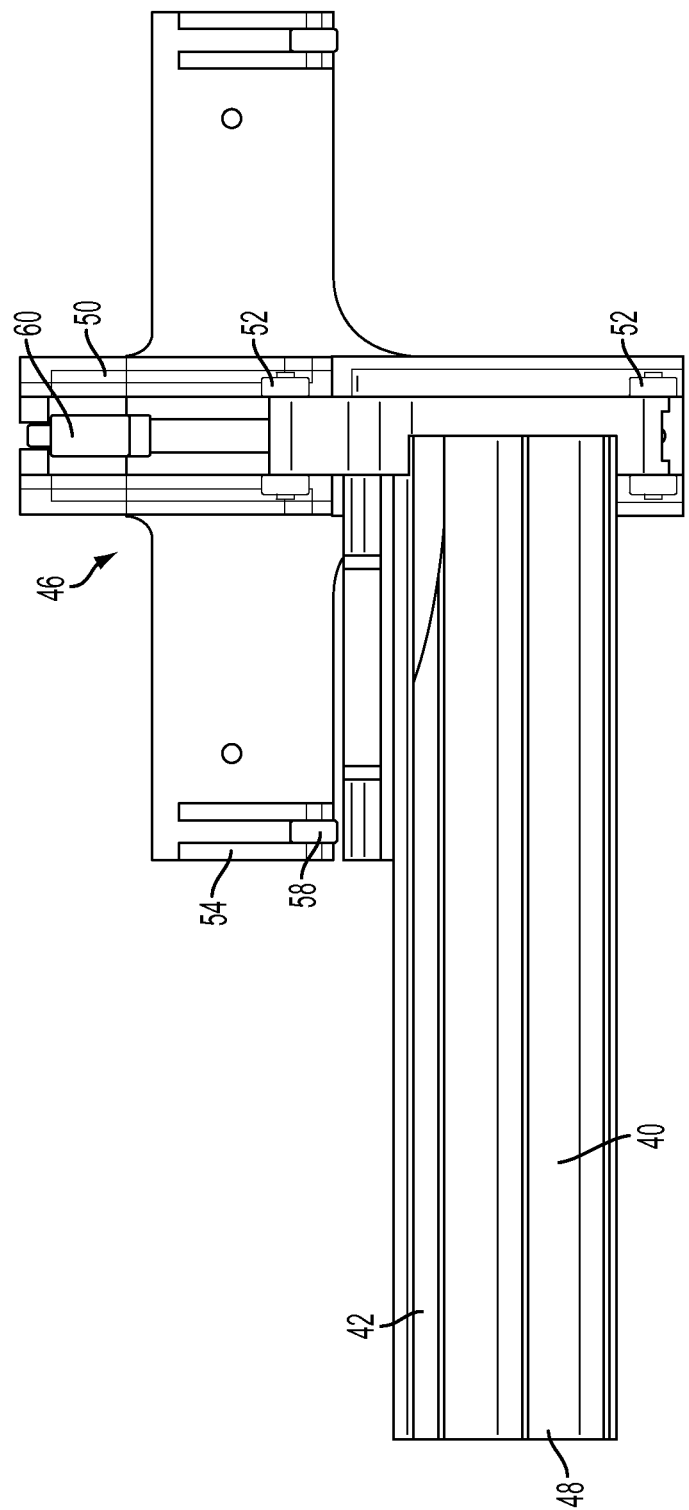
FIG. 3 is a top view of the grille close-out assembly illustrating the grille close-out assembly in a stowed position.
Figure 4:
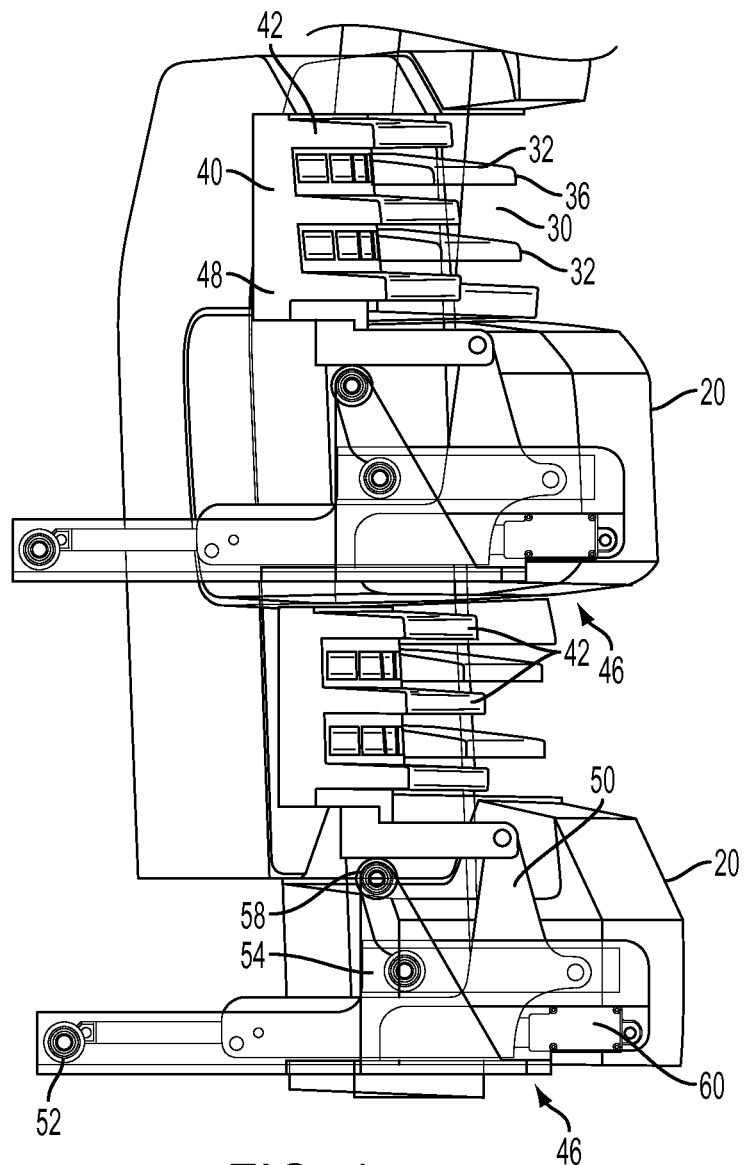
FIG. 4 is a side view of a front portion of a passenger vehicle including the grille and grille close-out assembly.

As shown in the top view of FIG. 3, the grille-close out assembly 12 include a plurality of deployment mechanisms 46. The deployment mechanisms 46 may be spaced apart in the transverse direction.

The deployment mechanism 46 that allow the close-out element 40 to translate linearly and rotate has several advantages over other grille closure mechanisms. By translating and rotating, the fins 42 can engage the grille openings 30 for a longer distance in the fore-aft direction, while being able to be rotated and stowed out of view. By engaging a longer distance in the fore-aft direction, the distal ends 44 of the fins 42 can extend adjacent the front surface 36 or an appearance surface.

The grille close-out assembly 12 may be capable of being positioned at many different deployed positions based on vehicle speed or environmental conditions, for example. The grille close-out controller to actuate the grille close-out assembly 12 to move the close-out element 40 between the stowed position and the deployed position. The controller may actuate the close-out assembly 12 based on vehicle speed, engine temperature or environmental conditions. For example, the grille close-out assembly 12 may be moved to the stowed position if the vehicle is being driven at lower speeds where there is not large drag. Or the grille close-out assembly 12 may be moved to the deployed position if the engine temperature or a time since key-on is low.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle grille close-out assembly comprising:
   a close-out element moveable between a stowed position and a deployed position and adapted to at least partially block an airflow opening in a vehicle grille in the deployed position;
   a carrier arm mounted to slide in a fore-aft direction, wherein the close-out element is pivotally connected to the carrier arm; and
   a support arm including at least one roller connected to the support arm and supporting the close-out element, wherein the close-out element translates on the roller with respect to the support arm when the carrier arm slides in the fore-aft direction,
   wherein the close-out element pivots and is unsupported by the support arm in the stowed position.

2. The vehicle grille of claim 1 further comprising a linear actuator operatively connected to the carrier arm to move the carrier arm in the fore-aft direction.

3. The vehicle grille of claim 1 wherein the close-out element includes a back-plate and a plurality of fins extending from the back plate, wherein in the deployed position, the plurality of fins cooperate with a plurality of airflow openings in the vehicle grille.

4. The vehicle grille of claim 3 wherein in the deployed position, the fins generally extend in the fore-aft direction, and in the stowed position, the fins generally extend in an upright direction.

5. The vehicle grille of claim 1 wherein when the support arm is disposed along a distal end portion of the close-out element, and the carrier arm slides beyond the support arm.

6. The vehicle grille of claim 1 wherein the support arm is mounted to a vehicle frame and the carrier arm is operatively connected to the vehicle frame by a roller.

7. A vehicle grille assembly comprising:
   a grille; and
   a close-out element having a plurality of fins extending from a back-plate and adapted to at least partially block an airflow opening in the grille in a deployed position, wherein the close-out element is moveable to a stowed position by rotating and translating in a fore-aft direction being transverse to a front surface of the grille.

8. The vehicle grille assembly of claim 7 wherein the grille includes a plurality of airflow openings spaced apart in an upright direction and being elongated in a transverse direction, wherein in the deployed position, the plurality of fins extend in the fore-aft direction, one of the plurality of fins disposed in each of the plurality of airflow openings.

9. The vehicle grille assembly of claim 8 wherein in the stowed position, the plurality of fins extend from the back-plate in the upright direction.

10. The vehicle grille assembly of claim 7 wherein in the deployed position, a distal end of the plurality of fins is generally coplanar with the front surface of the grille.

11. The vehicle grille assembly of claim 7 wherein the grille assembly further comprises:
    a carrier arm mounted to slide in the fore-aft direction, wherein the close-out element is pivotally connected to the carrier arm; and
    a support arm including at least one roller connected to the support arm and supporting the close-out element, wherein the close-out element translates on the roller with respect to the support arm when the carrier arm slides in the fore-aft direction,
    wherein the close-out element pivots and is unsupported by the support arm in the stowed position.

12. A vehicle comprising:
    a front fascia having a grille defining at least one airflow opening; and
    a grille close-out assembly having a close-out element including a plurality of fins mounted to a back-plate adapted to at least partially block the airflow opening in a deployed position, wherein the close-out element is moveable to a stowed position by rotating and translating in a fore-aft direction being transverse to a front surface of the grille to a deployed position.

13. The vehicle of claim 12 wherein the grille includes a plurality of airflow openings spaced apart in a vertical direction and being elongated in a transverse direction, wherein in the deployed position, the plurality of fins extend in the fore-aft direction, one of the plurality of fins disposed in each of the plurality of airflow openings.

14. The vehicle of claim 12 wherein in the stowed position, the plurality of fins extend from the back-plate in an upright direction.

15. The vehicle of claim 12 wherein the grille close-out assembly further comprises:
    a carrier arm mounted to slide in the fore-aft direction, wherein the close-out element is pivotally connected to the carrier arm; and
    a support arm including at least one roller connected to the support arm and supporting the close-out element, wherein the close-out element translates on the roller with respect to the support arm when the carrier arm slides in the fore-aft direction,
    wherein the close-out element pivots and is unsupported by the support arm in the stowed position.

* * * * *